US007003731B1

(12) United States Patent
Rhoads et al.

(10) Patent No.: US 7,003,731 B1
(45) Date of Patent: Feb. 21, 2006

(54) USER CONTROL AND ACTIVATION OF WATERMARK ENABLED OBJECTS

(75) Inventors: Geoffrey B. Rhoads, West Linn, OR (US); Tony F. Rodriguez, Portland, OR (US); Tyler J. McKinley, West Linn, OR (US); Marc D. Miller, Corte Madera, CA (US); Kirstin Hierholzer, Portland, OR (US)

(73) Assignee: Digimare Corporation, Beaverton, OR (US)

( * ) Notice: Subject to any disclaimer, the term of this patent is extended or adjusted under 35 U.S.C. 154(b) by 515 days.

(21) Appl. No.: 09/690,773

(22) Filed: Oct. 17, 2000

Related U.S. Application Data

(63) Continuation-in-part of application No. 09/633,587, filed on Aug. 7, 2000, and a continuation-in-part of application No. 09/571,422, filed on May 15, 2000, and a continuation-in-part of application No. 09/560,976, filed on Apr. 28, 2000, now Pat. No. 6,553,129, and a continuation-in-part of application No. 09/314,648, filed on May 19, 1999, now Pat. No. 6,681,028, which is a continuation-in-part of application No. 09/343,104, filed on Jun. 29, 1999, which is a continuation of application No. 08/746,613, filed on Nov. 12, 1996, now Pat. No. 6,122,403, which is a continuation-in-part of application No. 08/649,419, filed on May 16, 1996, now Pat. No. 5,862,260, which is a continuation-in-part of application No. PCT/US96/06618, filed on May 7, 1996, which is a continuation-in-part of application No. 08/508,083, filed on Jul. 27, 1995, now Pat. No. 5,841,978.

(60) Provisional application No. 60/134,782, filed on May 19, 1999.

(51) Int. Cl.
  *G09G 5/00* (2006.01)

(52) U.S. Cl. .................. 715/768; 380/202; 380/255; 705/50

(58) Field of Classification Search ................ 345/768, 345/744, 765; 382/100, 232; 380/202, 255; 715/768, 744, 765; 713/150, 193; 705/50
See application file for complete search history.

(56) References Cited

U.S. PATENT DOCUMENTS 4,659,919 A   4/1987 Price (Continued)

FOREIGN PATENT DOCUMENTS

EP          493091          7/1992

(Continued)

OTHER PUBLICATIONS

Jian Zhao, "A WWW Service to Embed and Prove Digital Copyright Watermarks," May 1996.*

(Continued)

*Primary Examiner*—Tadesse Hailu
(74) *Attorney, Agent, or Firm*—Digimare Corporation

(57) ABSTRACT

Methods and systems for associating watermark enabled objects with machine behaviors. Machine behaviors refer to actions by devices or systems in response to a triggering event. Examples of these behaviors include fetching a web page, opening an email client to send an email to a specific person, initiating a phone or video conference call, etc. A registration system enables users to associate machine behaviors with objects through a watermark embedded in the objects. The decoding of the watermark initiates a process for triggering the machine behaviors associated with the watermarked object. While the disclosure describes an implementation for stickers as a class of watermark enabled objects, the system and related methods apply to other forms of watermark enabled objects, including both electronic and physical objects.

10 Claims, 2 Drawing Sheets

U.S. PATENT DOCUMENTS

| | | | |
|---|---|---|---|
| 4,807,031 A | 2/1989 | Broughton et al. | |
| 4,846,693 A | 7/1989 | Baer | |
| 4,953,080 A | 8/1990 | Dysart et al. | 526/208 |
| 5,013,047 A | 5/1991 | Schwab | |
| 5,026,058 A | 6/1991 | Bromley | |
| 5,314,336 A | 5/1994 | Diamond et al. | |
| 5,331,547 A | 7/1994 | Laszlo | |
| 5,385,371 A | 1/1995 | Izawa | |
| 5,411,259 A | 5/1995 | Pearson et al. | |
| 5,450,490 A | 9/1995 | Jensen et al. | |
| 5,463,209 A | 10/1995 | Figh et al. | |
| 5,495,581 A | 2/1996 | Tsai | |
| 5,517,336 A | 5/1996 | Molee | |
| 5,533,124 A | 7/1996 | Smith et al. | |
| 5,575,659 A | 11/1996 | King et al. | |
| 5,606,609 A * | 2/1997 | Houser et al. | 713/179 |
| 5,612,943 A | 3/1997 | Moses et al. | |
| 5,617,119 A | 4/1997 | Briggs et al. | |
| 5,621,864 A * | 4/1997 | Benade et al. | 358/1.18 |
| 5,638,513 A * | 6/1997 | Ananda | 713/202 |
| 5,640,193 A | 6/1997 | Wellner | |
| 5,640,647 A | 6/1997 | Hube | |
| 5,644,711 A | 7/1997 | Murphy | 713/202 |
| 5,673,316 A | 9/1997 | Auerbach et al. | |
| 5,680,619 A * | 10/1997 | Gudmundson et al. | 717/108 |
| 5,689,561 A | 11/1997 | Pace | |
| 5,689,626 A * | 11/1997 | Conley | 358/1.18 |
| 5,742,845 A | 4/1998 | Wagner | |
| 5,743,801 A | 4/1998 | Welander | |
| 5,748,731 A | 5/1998 | Shepherd | |
| 5,754,981 A | 5/1998 | Veeneman et al. | 705/26 |
| 5,765,152 A * | 6/1998 | Erickson | 707/9 |
| 5,765,176 A | 6/1998 | Bloomberg | |
| 5,768,426 A * | 6/1998 | Rhoads | 382/232 |
| 5,778,102 A * | 7/1998 | Sandford et al. | 382/251 |
| 5,795,213 A | 8/1998 | Goodwin | |
| 5,804,803 A | 9/1998 | Cragun et al. | |
| 5,810,666 A | 9/1998 | Mero et al. | |
| 5,825,892 A | 10/1998 | Braudaway et al. | |
| 5,841,978 A | 11/1998 | Rhoads | |
| 5,848,413 A | 12/1998 | Wolff | |
| 5,853,327 A | 12/1998 | Gilboa | |
| 5,855,483 A | 1/1999 | Collins | |
| 5,892,900 A | 4/1999 | Ginter et al. | |
| 5,899,700 A | 5/1999 | Williams et al. | |
| 5,900,608 A | 5/1999 | Iida | |
| 5,902,353 A | 5/1999 | Reber et al. | |
| 5,903,729 A | 5/1999 | Reber et al. | |
| 5,905,248 A | 5/1999 | Russell et al. | |
| 5,905,800 A | 5/1999 | Moskowitz et al. | |
| 5,906,369 A | 5/1999 | Brennan | |
| 5,915,027 A | 6/1999 | Cox et al. | |
| 5,915,115 A * | 6/1999 | Talati | 717/155 |
| 5,932,863 A | 8/1999 | Rathus et al. | |
| 5,933,798 A | 8/1999 | Linnartz | |
| 5,938,726 A | 8/1999 | Reber et al. | |
| 5,940,595 A | 8/1999 | Reber et al. | |
| 5,954,332 A | 9/1999 | Mero et al. | |
| 5,954,515 A | 9/1999 | Iggulden | |
| 5,956,877 A | 9/1999 | Raasch et al. | |
| 5,959,281 A | 9/1999 | Domiteaux | |
| 5,974,548 A | 10/1999 | Adams | |
| 5,978,773 A | 11/1999 | Hudetz et al. | |
| 5,982,736 A | 11/1999 | Pierson | |
| 5,995,105 A | 11/1999 | Reber et al. | |
| 6,052,486 A | 4/2000 | Knowlton et al. | |
| 6,081,827 A | 6/2000 | Reber et al. | |
| 6,082,774 A | 7/2000 | Schlauch | |
| 6,084,528 A | 7/2000 | Beach et al. | |
| 6,122,403 A | 9/2000 | Rhoads | |
| 6,138,151 A | 10/2000 | Reber et al. | |
| 6,160,540 A | 12/2000 | Fishkin et al. | |
| 6,164,534 A | 12/2000 | Rathus et al. | |
| 6,190,174 B1 | 2/2001 | Lam | |
| 6,199,048 B1 | 3/2001 | Hudetz et al. | |
| 6,200,216 B1 | 3/2001 | Peppel | |
| 6,256,398 B1 | 7/2001 | Chang | |
| 6,309,690 B1 | 10/2001 | Brogger et al. | |
| 6,311,214 B1 | 10/2001 | Rhoads | |
| 6,314,457 B1 | 11/2001 | Schena et al. | |
| 6,324,573 B1 | 11/2001 | Rhoads | |
| 6,332,031 B1 | 12/2001 | Rhoads et al. | |
| 6,345,256 B1 * | 2/2002 | Milsted et al. | 705/1 |
| 6,434,561 B1 | 8/2002 | Durst, Jr. et al. | |
| 6,448,979 B1 | 9/2002 | Schena et al. | |
| 6,449,377 B1 | 9/2002 | Rhoads | |
| 6,456,725 B1 | 9/2002 | Cox et al. | |
| 6,470,096 B1 | 10/2002 | Davies et al. | |
| 6,505,160 B1 | 1/2003 | Levy et al. | |
| 6,510,234 B1 | 1/2003 | Cox et al. | |
| 6,526,449 B1 | 2/2003 | Philyaw et al. | |
| 6,535,614 B1 * | 3/2003 | Kimura et al. | 382/100 |
| 6,542,933 B1 | 4/2003 | Durst, Jr. et al. | |
| 6,553,129 B1 * | 4/2003 | Rhoads | 382/100 |
| 6,591,252 B1 | 7/2003 | Young | |
| 6,614,914 B1 | 9/2003 | Rhoads | |
| 6,681,028 B1 | 1/2004 | Rodriguez et al. | |
| 6,735,324 B1 | 5/2004 | McKinley et al. | |
| 2001/0001854 A1 | 5/2001 | Schena et al. | |
| 2002/0006212 A1 | 1/2002 | Rhoads et al. | |
| 2002/0012446 A1 | 1/2002 | Tanaka | |
| 2002/0023148 A1 | 2/2002 | Ritz et al. | |
| 2002/0049967 A1 | 4/2002 | Haseltine et al. | |
| 2002/0059162 A1 | 5/2002 | Shinoda et al. | |
| 2002/0062382 A1 | 5/2002 | Rhoads et al. | |
| 2002/0073214 A1 | 6/2002 | Iinuma | |
| 2002/0075298 A1 | 6/2002 | Schena et al. | |
| 2002/0080271 A1 | 6/2002 | Eveleens et al. | |
| 2002/0080396 A1 | 6/2002 | Silverbrook et al. | |
| 2002/0085759 A1 | 7/2002 | Davies et al. | |
| 2002/0102966 A1 | 8/2002 | Lev et al. | |
| 2002/0153661 A1 | 10/2002 | Brooks et al. | |
| 2002/0155893 A1 | 10/2002 | Swanberg et al. | |

FOREIGN PATENT DOCUMENTS

| | | |
|---|---|---|
| EP | 975147 | 1/2000 |
| EP | 1001605 | 5/2000 |
| JP | 7115474 | 5/1995 |
| WO | WO97/43736 | 11/1997 |
| WO | WO9803923 | 1/1998 |
| WO | WO00/07356 | 2/2000 |
| WO | WO00/26749 | 5/2000 |
| WO | WO0115021 | 3/2001 |
| WO | WO01/61987 | 8/2001 |
| WO | WO0173586 | 10/2001 |
| WO | WO01/84438 | 11/2001 |
| WO | WO02/03328 | 1/2002 |

OTHER PUBLICATIONS

Jean-Henry Morin and Dimitri Konstantas, "Hypernews: A Media Application for the Commercialization of an Electronic Newspaper," ACM, 1998.*

James Kempf, "Cross-Address Space Dynamic Linking," Sep. 1992.*

U.S. Appl. No. 09/630,243, filed Jul. 31, 2000, McKinley et al.

U.S. Appl. No. 09/571,422, filed May, 15, 2000, Rhoads et al.

U.S. Appl. No. 09/709,255, filed Nov. 8, 2000, Hannigan et al.

U.S. Appl. No. 60/141,468, filed Jun. 29, 1999, Livermore.

U.S. Appl. No. 60/288,272, filed May 2, 2001, Sharma et al.

U.S. Appl. No. 60/297,229, filed Jun 7, 2001, Hannigan et al.

U.S. Appl. No. 60/355,856, filed Feb. 10, 2002, Hannigan et al.

"1999 NFL Rookies Featured in Upper Deck's PowerDeck Lineup," Upper Deck press release, Aug. 17, 1999, 2 pages.

Acken, "How Watermarking Adds Value to Digital Content," Communications of the ACM, vol. 41, No. 7, Jul. 1998, pp. 75-77.

Alattar, "'Smart Images' Using Digitmarc's Watermarking Technology," Proc. SPIE vol. 3971: Security and Watermarking of Multimedia Contents II, Jan. 24-26, 2000, pp. 264-273.

"Digimarc Turns Online Images into Powerful Marketing Agents," Digimarc press release, Jul. 20, 1998, 3 pages.

McDonald, "Making a MARC: Digimarc's MediaBridge fastens print advertising to the Internet," Publishing & Production Executive, vol. 14, No. 6, Jun. 2000, pp. 40, 42 and 44.

"Newly Released Magic: The Gathering Interactive Encyclopedia CD-ROM Makes Every Magic Card Ever Printed Available for Electronic Play," Wizards of the Coast press release, Nov. 10, 1999, 2 pages.

"Overlay Plug-In User's Guide," Plug-in- Systems, 1996, 12 pages. the ACM, vol. 41, No. 7, Jul. 1998, pp. 67-72.

Yeung et al., "Digital Watermarks: Shedding Light on the Invisible," IEEE Micro, vol. 18, No. 6, Nov./Dec. 1998, pp. 32-41.

Zhao et al., "In Business Today and Tomorrow," Communications of the ACM, vol. 41, No. 7, Jul. 1998, pp. 67-72.

Arai et al., Retrieving Electronic Documents with Real-World Objects on InteractiveDESK, Nov. 14, 1995, UIST '95, pp. 37-38.

Arai et al., "InteractiveDESK: A Computer-Augmented Desk Which Responds to Operations on Real Objects," CHI '95 Mosaic of Creativity, May 7-11, 1995, pp. 141-142.

Berners-Lee et al., "World-Wide Web: The Information Universe," Electronic Networking, vol. 2, No. 1, Spring 1992, pp. 52-58.

Berners-Lee et al., "The World-Wide Web," Computer Networks and ISDN Systems 25 (1992) pp. 454-459.

Buyens, "Building Net Sites with Windows NT," Excerpt from Chapter 16, Advanced Web Services, 1996, 7 pages.

Davison, "Clickable Images in HTML," Dr. Dobbs Journal, Sep. 1995, 9 pages.

Lungstrand et al., "WebStickers: Using Physical Tokens to Access, Manage and Share Bookmarks to the Web," DARE 2000, Apr. 12, 2000, 9 pages.

Nickerson, "WorldWideWeb: Hypertext from CERN," Computers in Libraties, Dec. 1992, vol. 12, No. 11, pp. 75-78.

NCSA Imagemap Tutorial, http://hoohoo.ncsa.uiuc.edu/docs/tutorials/imagemapping.html, Nov. 5, 1995, 5 pages.

Rekimoto et al., "CyberCode: Designing Augmented Reality Environments with Visual Tags," DARE 2000, Apr. 12, 2000, 10 pages.

Rekimoto et al., "Augment-able Reality: Situation Communication Through Physical and Digital Spaces," Proc. of 2d Int. Symp. on Wearable Computers, Oct., 1998.

Want et al., "Bridging Physical and Virtual Worlds with Electronic Tags," CHI 99, May 15, 1999, pp. 370-377.

Webcom HTML Guide, http://www.webcom.com/html/tutor/imap_concepts.shtml, 1994, 2 pages.

* cited by examiner

USER CONTROL AND ACTIVATION OF WATERMARK ENABLED OBJECTS

RELATED APPLICATION DATA

This patent application is a continuation in part of U.S. patent application Ser. No. 09/633,587, filed Aug. 7, 2000, which is a continuation in part of U.S. patent application Ser. No. 09/343,104, filed Jun. 29, 1999. U.S. patent application Ser. No. 09/343,104 claims priority from U.S. Provisional Application No. 60/134,782, filed May 19, 1999. This patent application is also a continuation in part of U.S. patent application Ser. No. 09/571,422, filed May 15, 2000, which claims priority to U.S. Provisional Application No. 60/134,782, filed May 19, 1999. These patent applications are hereby incorporated by reference. This patent application is also a continuation in part of U.S. patent application Ser. No. 09/560,976, filed Apr. 28, 2000 (Now U.S. Pat. No. 6,553,129), which is a continuation of U.S. application Ser. No. 08/746,613, filed Nov. 12, 1996 (now U.S. Pat. No. 6,122,403), which is a continuation in part of U.S. application Ser. No. 08/649,419, filed May 16, 1996 (now U.S. Pat. No. 5,862,260), PCT Application No. PCT/US96/06618, filed May 7, 1996 (Published as WO96/36163), and U.S. application Ser. No. 08/508,083, filed Jul. 27, 1995 (now U.S. Pat. No. 5,841,978). This patent application is also a continuation in part of U.S. patent application Ser. No. 09/314,648, filed May 19, 1999 (Now U.S. Pat. No. 6,681,028).

The subject matter of the present application is related to that disclosed in U.S. Pat. No. 5,862,260, and in application Ser. No. 09/503,881, filed Feb. 14, 2000 (now U.S. Pat. No. 6,614,914), which are hereby incorporated by reference.

TECHNICAL FIELD

The invention relates to multimedia signal processing, and in particular relates to hiding auxiliary information in media signals like audio, video and image signals.

BACKGROUND AND SUMMARY

Digital watermarking is a process for modifying physical or electronic media to embed a machine-readable code into the media. The media may be modified such that the embedded code is imperceptible or nearly imperceptible to the user, yet may be detected through an automated detection process. Most commonly, digital watermarking is applied to media signals such as images, audio signals, and video signals. However, it may also be applied to other types of media objects, including documents (e.g., through line, word or character shifting), software, multi-dimensional graphics models, and surface textures of objects.

Digital watermarking systems typically have two primary components: an encoder that embeds the watermark in a host media signal, and a decoder that detects and reads the embedded watermark from a signal suspected of containing a watermark (a suspect signal). The encoder embeds a watermark by altering the host media signal. The reading component analyzes a suspect signal to detect whether a watermark is present. In applications where the watermark encodes information, the reader extracts this information from the detected watermark.

Several particular watermarking techniques have been developed. The reader is presumed to be familiar with the literature in this field. Particular techniques for embedding and detecting imperceptible watermarks in media signals are detailed in the assignee's co-pending application Ser. No. 09/503,881 and U.S. Pat. No. 5,862,260, which are hereby incorporated by reference.

The invention provides methods and systems for associating watermark enabled objects with machine behaviors. In this context, machine behaviors refer to actions by devices or systems in response to a triggering event. Examples of these behaviors include fetching a web page, opening an email client to send an email to a specific person, initiating a phone or video conference call, etc. In the detailed description to follow, a watermark system enables users to associate machine behaviors with objects through a watermark embedded in the objects. The decoding of the watermark initiates a process for triggering the machine behaviors associated with the watermarked object. While the detailed description focuses on an implementation for stickers as a class of watermark enabled objects, the system and related methods apply to other forms of watermark enabled objects.

Further features will become apparent with reference to the following detailed description and accompanying drawings.

DETAILED DESCRIPTION

Figure 1:
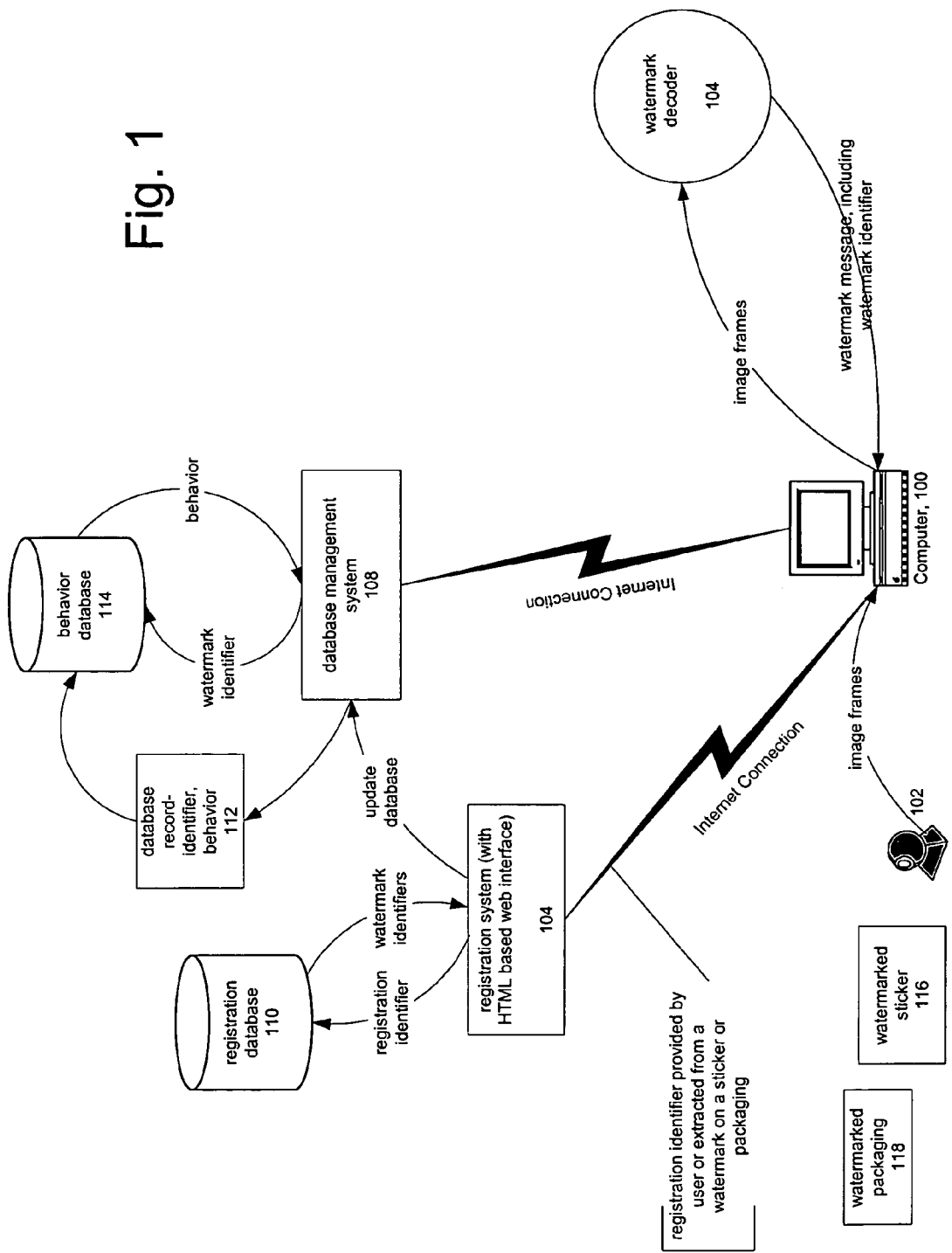
FIG. 1 is a system diagram depicting a system for associating watermark enabled objects with machine behaviors, and for triggering those behaviors in response to decoding watermarks.

The following description details a system and related methods for associating watermark enabled objects with machine behaviors. To illustrate the system, the description focuses on an example of watermark enabled stickers. As noted, the system applies more broadly to watermarking both physical and electronic objects. In particular, aspects of the system may be used for watermarking media signals like images, video and audio, as well as applying watermarks to physical objects. Watermarks may be applied to physical objects by placing a watermarked image on a physical object, by modulating the surface topology of the object, etc. See U.S. Pat. No. 5,862,260, for more information about watermark embedding of and decoding from physical and electronic objects.

Stickers in all their varieties have found an enduring place in our society. From the workplace (Post-It® brand message notes), to kids in a classroom, stickers have an inherent value associated with them, whether it be functional (seals, labels, etc.) or just to identify yourself with a particular affinity group (bumper stickers on cars). By placing a watermark on stickers they can be used in novel ways. By encoding a set of stickers with a watermark during production, specific machine behaviors can be assigned to them. These behaviors can be associated or even possibly changed by anyone from the manufacturer through the distributor, all the way to the end-user. In addition, the users can create their own watermark enabled stickers by creating an image, embedding a watermark in it, and associating the watermark with one or more machine behaviors.

These behaviors may include, but are not limited to the following:

Taking the user to a web-site linked to the watermark via a network address of the web-site or index to the network address.

Opening an email client to email to a specific person (e.g., a person whose email address is stored in the machine behavior description associated with the watermark).

Launching the user into an Interframe Relay Chat (IRC) session that other people with the same sticker can participate in.

Authenticating the user as part of a process of accessing a network resource, such as account information or access to a computer network.

Authentication the user in an electronic commerce transaction performed on a computer network.

Sending an electronic card.

Placing a phone or video-conference call.

As props in a computer game. For example, the prop is a multi-sided, or multi-faceted object, where each side or facet has a watermarked image conveying a different message used to control the game. The computer game includes a watermark decoder for extracting the messages from image frames captured of the prop. The message may directly carry the message or act as an index to a more detailed game instruction in a database, such as an instruction that changes over time based on changes to the corresponding database entry by the user or game manufacturer.

As a visual aide for disabled users.

Anywhere where machine vision is not feasible.

In each of the above applications, the watermark carries information that links the watermarked object (e.g., sticker) with a machine behavior. To trigger this behavior, a watermark decoder application captures an image or images of the watermarked sticker, extracts the watermark, and uses information embedded in the watermark to determine the associated machine behavior. The watermark decoder then takes action to initiate the machine behavior associated with the watermark.

For some applications, it is useful to enable the user to control the behavior associated with a watermarked object. This type of management may be handled by creating accounts for users and providing access to the accounts via some authentication method (email, passwords, etc.). For a number of reasons, these access methods can be problematic (losing passwords, asking kids for their email addresses, etc.). As an alternative, watermarks may be used to manage the process of associating behaviors with a watermarked object.

For example, in the scenario where a user wants to assign behaviors to a set of watermarked stickers they have received, they can hold up the first sticker (or its packaging), and be taken to a registration application to activate the stickers in the pack.

FIG. 1 is a system diagram depicting a system for associating watermark enabled objects with machine behaviors, and for triggering those behaviors in response to decoding watermarks. The system depicted in FIG. 1 is implemented on a computer network, namely, the Internet. The user accesses the system via a computer 100 connected to the Internet. The computer broadly encompasses a variety of devices, such as Personal Computers, set-top boxes, personal digital assistants, Internet appliances, set-top boxes, telephones (including wireless devices), audio and video players, and imaging devices (CCD or CMOS cameras, camcorders, printers, fax machines, copiers, etc.). The computer is connected to an image capture device 102, such as a PC camera or scanner, and includes watermark decoder software for decoding watermarks from images captured from the image capture device.

The system architecture shown in FIG. 1 includes a system (106) for managing the process of assigning behaviors to watermarked objects as well as a database management system (108) for initiating behaviors in response to decoding watermarks from the objects. These two systems may be integrated or implemented separately. In the application depicted here, the registration system and database management system are accessible via a network interface using standard network technology, including HTML, XML, and TCP/IP. A watermark embedding system has previously embedded watermarks carrying watermark identifiers into stickers. The stickers (or packages of them) also include a registration identifier used to activate the behaviors associated with them.

The registration system maintains a registration database including records of the registration identifiers and corresponding watermark identifiers. The registration identifiers are serialized numbers corresponding to the watermarked stickers or packages of them. The watermark identifiers are a form of object identifiers that are encoded into the watermarks on the corresponding stickers. The registration system maintains a registration database 110 of data records indicating the watermark identifiers associated with each registration identifier. When a user selects a behavior to be associated with a watermarked object via the registration system, the registration system sends an update 112 to a behavior database 114 specifying the behavior to be associated with a corresponding watermark identifier. In response, the database management system 108 updates its database to include a record that indicates the behavior associated with a particular watermark identifier.

The database management system 108 is also responsible for supporting machine behavior associated with a watermarked sticker in response to detection of the watermark on the sticker. It has a network interface for communicating with other computers over the Internet. In particular, it receives requests in the form of an XML packet from a watermark decoding computer, extracts a watermark identifier from the packet and looks up the associated behavior or behaviors in the behavior database. It then initiates the associated behavior. The details of how this behavior is carried out depend on the application and type of behavior.

In a typical registration process, the user accesses the registration system via a registration web site, which presents an HTML interface to the users' computers. The user may fetch the HTML pages of this interface using an Internet browser or application program, like the watermark decoder application executing on the computer 100. This interface enables the user to enter a registration identifier to start a process of associating behaviors with watermark identifiers embedded in watermarked stickers. In response to a registration identifier, the registration system returns a page that enables the user to specify the behavior. In the case where the behavior is linking a watermarked sticker to a web site, the user specifies the network address of the web site, such as a URL or IP address. In the case where the behavior is linking a watermarked sticker to an email message, the user specifies the email address of the email recipient.

As noted above, there are many other types of watermark enabled behaviors. They can be classified as providing information to the watermark decoding computer, launching some software program or machine action, or a combination of both. Table 1 below gives some examples of behaviors, and the related information and actions.

TABLE 1

| Behavior Type | Information Returned to Decoding Computer | Associated Machine or Software Actions |
| --- | --- | --- |
| linking to web site | URL, web page | launching browser on client to fetch/render web page at URL |
| opening an email client | email address of target recipient | launching email client and populating address field with target recipient |
| starting a chat session | address of chat session | launching chat application (watermarks on the stickers can be designed such that only those holding the stickers can gain access to the chat session, each by showing the sticker to his or her watermark decoder enabled camera) |
| accessing account information or other network resources | address of account information | launching of browser application to access account information through a web interface; supplying user authentication information from watermarked object and/or from user (user password, user name, log on, etc.) |
| sending an electronic card | card template | launching client application to enable the user to design the card and add personal message, launching email application to send electronic card (or link to electronic card) |
| placing a phone or video conference call | phone number or IP address of destination | launching application to initiate phone call over the internet or telephone network |
| props in an interactive computer game | identifier of prop, and possibly other context information, such as game player holding the prop, etc. | game application receives prop and context information and responds accordingly |
| visual aid for disabled users | returns information in the form of graphics, audio, or video (may provide address of audio or video content at an audio or video server on the Internet) | browser, or other media player applications render the information (such as the streaming media) on the decoding computer |
| machine control | machine instruction | machine or software executes instruction |

For a given application, the registration system provides information to the user to enable the user to select the behavior and provide pertinent information, such as URL, IP address, phone number, email address, content file (e.g., audio, image or video file), etc. The registration system formulates a description of the behavior, associates it with the watermark identifier specified by the user, and creates an update 112 to the behavior database.

The user then uses the stickers or shares them with friends. To trigger the behavior of a sticker, a user captures an image of the sticker with an image capture device 102 using a watermark decoder application 104 executing on the computer 100. The watermark decoder extracts the watermark identifier from a watermark embedded in the image on the sticker. It then sends the watermark identifier to the database management system 108 via the Internet, which in turn, looks up the associated behavior. The database management system then triggers the associated behavior by sending information, or instructions back to the decoding computer. The decoding computer renders the information, and launches a software or other machine action associated with the instructions returned from the database. The database need not be implemented in a remote computer. For example, the database may be implemented in the watermark decoding computer or device.

As an enhancement to the registration process, objects may carry watermarks that automatically link the user to the registration web site. For example, one side of the sticker 116 or its packaging 118 may contain a watermark with the network address or an index to a network address of the registration web site. The user shows this part of the sticker or packaging to the image capture device. The watermark decoder extracts the watermark and looks up the network address in the behavior database, and launches a browser to fetch the registration web site. The watermark may also carry the registration identifier. In this case, the registration web site can tailor the web page returned to the user to be specific to the watermarked object. If the user or someone else previously associated a behavior with the sticker, the registration web site returns the current status associated with the registration identifier and the behaviors associated with the watermarked objects linked to that registration identifier. To get detailed information about particular watermarked objects during the registration process, the user can show the watermarked object to a camera, and use a watermark decoder to extract the watermark identifier and supply it to the registration system. In response, the registration system takes the watermark identifier, queries the behavior database via the database management system, and returns a description of the associated behaviors. This approach provides a simple and automated process of activating watermark enabled objects.

For more information about an object identifier registration system and system for linking objects with machine behaviors, see U.S. patent application Ser. No. 09/571,422, which is hereby incorporated by reference.

Figure 2:
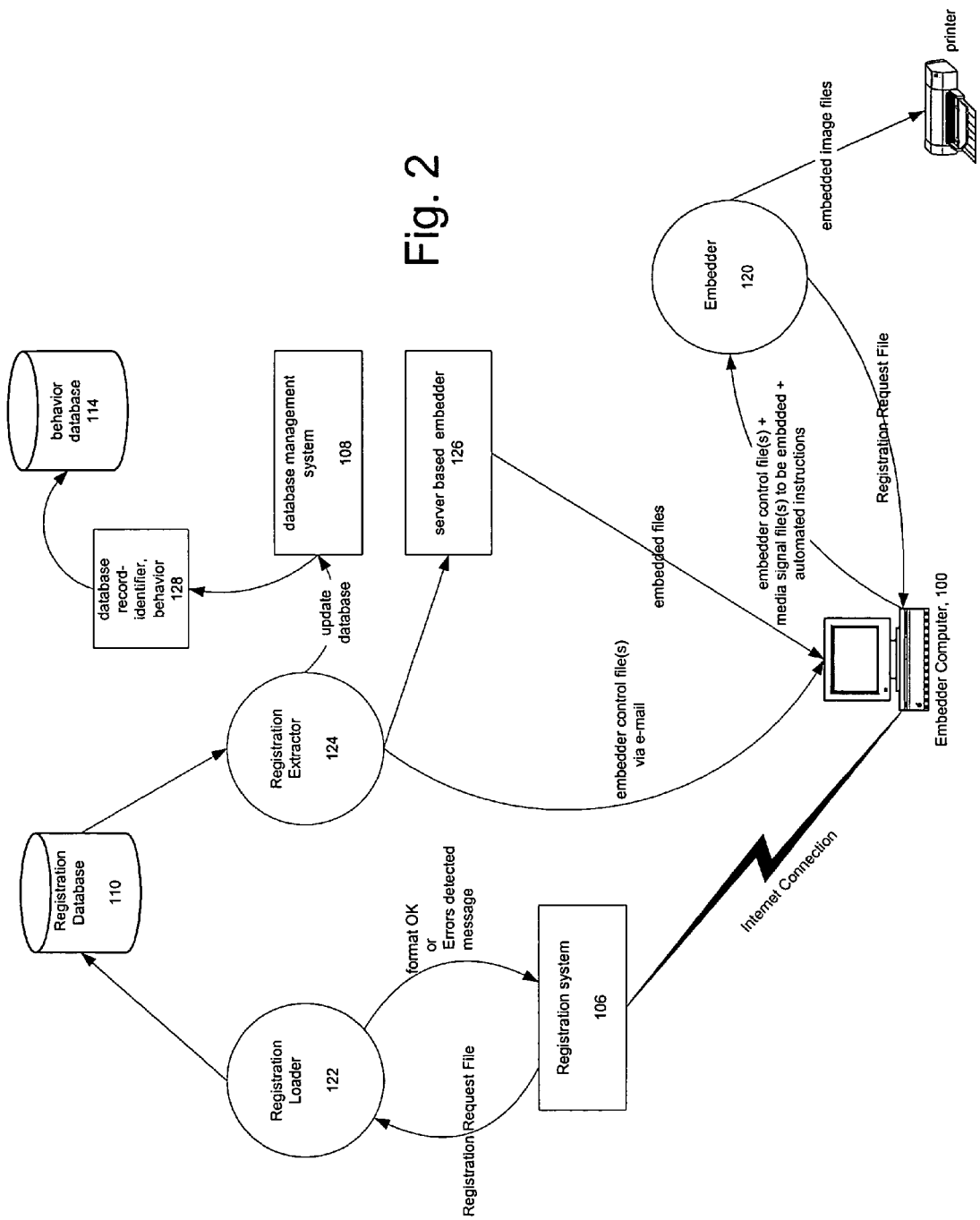
FIG. 2 is a diagram depicting a variant of the system shown in FIG. 1 showing system components for enabling users to perform watermark identifier registration and embedding.

In some applications, the user may wish to create his or her own watermarked objects. FIG. 2 illustrates a system that enables users to assign watermark identifiers to corresponding behaviors and objects and update the behavior database. In this particular system, the user's computer includes a watermark embedder application (120). However, the embedder application may be implemented on a separate computer, such as a server on the Internet accessible via a client application on the user's computer 100. In the former case, the user embeds the watermark into the desired image content on his computer. In the latter case, the client supplies the image content to the server, which performs watermark embedding and returns watermarked images to the client. In both cases, the watermarked objects are created by printing the watermarked images on objects.

The process begins when an embedder 120 creates a registration request. In the system shown in FIG. 2, the embedder 120 is a software application running on the computer 100. The embedder formulates the request in a request file. The system provides a template for the request file. The request file specifies the number of watermark identifiers requested and the names of the media files to be embedded. The file may also specify the behaviors to be associated with each watermark identifier. Alternatively, the user can specify the behaviors to be associated with the watermark identifier at a later time using the methods described in this document. In the case where embedding is performed on a server as opposed to the user's computer, the request file may also include the media file (e.g., an image file) carrying the content to be embedded with the watermark identifier.

Next, the embedder connects, via a network connection, to the registration system 106. In particular, it connects to a registration web site via an Internet connection. This web site requests the embedder's username and password to authenticate it.

The user enters his username and password via a user interface displayed on the PC 100 and submits them to the web site for authentication.

Upon authentication, the registration website 106 returns an HTML page presenting the embedder with a user interface screen that allows the user to locate the embedder's registration request file for uploading to the web site. The user then enters a command to instruct the embedder to upload the selected request file.

The embedder provides the information required to locate the file on the embedder's computer and submits it for upload.

The registration request file is uploaded into a registration loader program 122.

The registration loader 122 performs a quick scan of the uploaded registration request file and reports back to the embedder any errors in format that it detects. If there are errors, the file is not processed.

If the registration request file is properly formatted, the embedder receives a confirmation from the registration website 106 that the request file has been successfully uploaded and will be submitted for processing by the registration loader 122.

The embedder may now either submit a new registration request file or logoff of the registration web site 106.

The registration loader 122 uses the information contained in the embedder's uploaded registration request file to automatically allocate (register) watermark identifiers in a registration database 110. The identifiers are in the form of serial numbers. Once this process is completed, the registration loader 122 initiates a request to a registration extractor 124 for these new registration entries.

Upon receipt of a request, the registration extractor 124 accesses the registration database 110 and creates embedder control files for each of these new registered watermark identifiers (e.g., serial numbers).

Upon completion of this process, the registration extractor 124 process sends the embedder control file(s) back to the embedder via Internet e-mail. In the event that the embedder is server based, the extractor sends the control file(s) (or a pointer to them) to the embedder server 126, which may be integrated with the registration system or implemented at a different Internet site. The extractor 124 also sends an update 128 to the behavior database 114 to create database records associating each of the watermark identifier with a behavior.

Once the embedder 120 has received the embedder control file(s), it uses these file(s), along with the media file(s) (in this case, image files) and a set of embedding instructions to the embedder 120 to instruct the embedder to automatically embed the list of watermark serial numbers included in the embedder control file(s) into the listed media files, producing a set of watermark-embedded media files. In the case where the embedder is server based, the client executing on the PC 100 uploads the media files to be embedded to the embedder server, either directly or as part of the registration process (e.g., as part of the request file). The embedder server then returns the watermarked files to the computer 100 via e-mail or other network file transfer protocol.

For detailed disclosure describing how to embed watermarks in media signals, including images, audio, and video, see U.S. Pat. No. 5,862,260, and co-pending application Ser. No. 09/503,881, filed Feb. 14, 2000, incorporated above.

The embedder may create watermarked objects by printing watermarked images on objects, such as stickers, documents, etc. The embedder sends the watermarked image to a printer 128, which in turn, prints the image on an object.

The above system provides a mechanism for linking objects to machine behaviors. As noted previously, this mechanism applies to both physical objects, like stickers and packaging, and electronic objects, like image, audio and video signals. It also applies to other forms of machine readable signal carriers that can be applied to such objects, including bar codes, magnetic stripes, Radio Frequency tags, integrated circuit chips, organic transistors, etc. These machine readable carriers can be used in the same way that watermarks are used in the example of watermarked enabled stickers above.

While these technologies provide a mechanism for linking objects to machine behaviors, there is a need for a tool that explicitly facilitates the creative coordination between the object and the behavior linked to it. The linking process results in a potentially complex database structure which not only embodies the fundamental object to behavior link, but also might include a hierarchy of delivered responses as a function of user implicit or explicit requests. Or, said in a quite different way, the creative process of linking an object to complex data-driven responses is itself a creative endeavor all to itself, involving thinking through the various different reactions that users will want and expect when using an object as a portal. The artist who is tasked with creating the choreography between an object and a simple or complex machine behavior will need explicit assistance from well designed tools, resulting in a database record which memorializes that creativity as an active element within a connectivity system described in this document and U.S. patent application Ser. No. 09/571,422. The immediate creative output is a database structure. The long term creative output is the active use of that structure as a stimulus-response hub.

Whether a link design tool be web-server based, or whether it be a stand-alone application similar in kind to an Adobe Photoshop or a Quark Express, it is possible to offer visual metaphors to a creative designer which literally presents that designer with an image of the to-be-linked object along with explicit visual links to one or more data responses.

One embodiment of this tool for linking printed objects to web pages is a local computer application which presents an image of a printed object on the left side of an application's window pane and the image of a web page on the right side of the application pane. The images of the printed objects may be stored locally or fetched from a remote device (e.g., a content database) and rendered to the left side of the screen. Similarly, the web pages may be stored locally or downloaded from web sites on the Internet or some other network. The user interface of the application displays a control such as a button, labeled, "Connect", "Link" or some other active word representing the process of associating an object with a corresponding machine behavior. The user, having browsed through a series of objects to be linked, and browsed through a series of potential web site destinations, finding the best "matched-pair", pushes the button and off this relational link goes into a queue waiting to "go live", or, in other words, a temporary record is stored for a candidate link to be sent to the behavior database of the linking system described previously. A user can perform multiple links per session, queueing them up as they go, reviewing the queue at some point in time, then directing the links to become active at the behavioral database, as described previously and in the referenced documents.

An extension begins by generalizing the single printed item to be an icon or visual analogy to a related set of printed material. Graphical user interface methods can be employed to move, manipulate, view and otherwise process this icon in a fashion familiar to creative professionals. Likewise, surrounding this generalized icon representing the object(s) to be printed can be a whole series of icons representing a variety of potential data-delivered responses that are possible links. Existing web pages, placeholders for web pages to be designed, streaming media icons, Java application icons, "links to links" icons wherein a given response may explicitly point to a menu of actions presented to the end user. (end user=consumer doing the linking). This list of possible responses is incomplete but nevertheless representative of graphically displaying the possible relationships between printed material and data responses.

As in the baseline case, various relationships can be created between objects and responses, ultimately stored into a queue. The actual functionality and quality assurance of the links could be tested in the process. Once the creative artist is satisfied with their link or set of links, the queue can be sent to go live at the behavior database and further double checks on quality performed.

CONCLUDING REMARKS

Having described and illustrated the principles of the technology with reference to specific implementations, it will be recognized that the technology can be implemented in many other, different, forms. To provide a comprehensive disclosure without unduly lengthening the specification, applicants incorporate by reference the patents and patent applications referenced above.

While the invention is illustrated with reference to watermarked stickers, aspects of the invention apply to other object types including media signals like audio and video. There are number of different watermark embedding and decoding methods that may be used. The watermark embedding process may modulate features of a signal in the time, frequency, spatial or some other transform domain of the signal to be watermarked.

In addition to an object identifier, the watermark may be used to convey other information, such as an index to related metadata, rendering control instructions, etc. For example, the watermark can carry a network address or index to a network address to link the watermarked signal to a network resource such as a related web site.

Other machine readable codes may be embedded in an object and used to link the object to a machine behavior. Some examples include bar codes, magnetic stripes, RF tags, etc. The devices and methods used to extract an identifier from the machine readable code differ, yet the process for registering identifiers and associating behavior with objects may be similar.

The methods, processes, and systems described above may be implemented in hardware, software or a combination of hardware and software. For example, the auxiliary data encoding processes may be implemented in a programmable computer or a special purpose digital circuit. Similarly, auxiliary data decoding may be implemented in software, firmware, hardware, or combinations of software, firmware and hardware. The methods and processes described above may be implemented in programs executed from a system's memory (a computer readable medium, such as an electronic, optical or magnetic storage device).

The particular combinations of elements and features in the above-detailed embodiments are exemplary only; the interchanging and substitution of these teachings with other teachings in this and the incorporated-by-reference patents/applications are also contemplated.

We claim:

1. A system for enabling a user to associate a machine behavior with an object comprising:
    a registration system enabling a user to specify a machine behavior to be associated with an object via an object identifier;
    a database management system in communication with the registration system for receiving and maintaining records associating object identifiers with machine behaviors, wherein the database management system is operable to receive object identifiers and in response, to initiate the machine behavior or behaviors associated with the object identifiers; wherein the object identifiers comprise watermark identifiers which are embedded in watermarks on corresponding objects by altering signals that are to form part of the objects to embed the object identifiers in the signals in a machine readable form.

2. The system of claim 1 wherein the objects are watermarked stickers.

3. A system for enabling a user to associate a machine behavior with an object comprising:
    a registration system enabling a user to specify a machine behavior to be associated with an object via an object identifier;
    a database management system in communication with the registration system for receiving and maintaining records associating object identifiers with machine behaviors, wherein the database management system is operable to receive object identifiers and in response, to initiate the machine behavior or behaviors associated with the object identifiers; wherein the object identifiers comprise watermark identifiers which are embedded in watermarks on corresponding objects; and wherein the machine behavior includes fetching a web site relating to an object carrying the object identifier.

4. A system for enabling a user to associate a machine behavior with a physical object comprising:
    a registration system enabling a user to specify a machine behavior to be associated with a physical object via an object identifier encoded in a machine readable signal carrier on the physical object;
    a database management system in communication with the registration system for receiving and maintaining records associating object identifiers with machine behaviors, wherein the database management system is operable to receive object identifiers and in response, to initiate the machine behavior or behaviors associated with the object identifiers, including a user interface that enables a user to view an image of an object along with an image of a behavior to be associated with the object, the user interface including a control that enables the user to associate the object with the behavior, and the user interface being operable to communicate a database structure to the database management system specifying an object identifier for the object and a description of the behavior; wherein the object identifier is embedded into the object using a watermark.

5. A system for enabling a user to associate a machine behavior with an object comprising:
- a registration system enabling a user to specify a machine behavior to be associated with an object via an object identifier;
- a database management system in communication with the registration system for receiving and maintaining records associating object identifiers with machine behaviors, wherein the database management system is operable to receive object identifiers and in response, to initiate the machine behavior or behaviors associated with the object identifiers;
- a user interface that enables a user to view an image of an object along with an image of a behavior to be associated with the object, the user interface including a control that enables the user to associate the object with the behavior, and the user interface being operable to communicate a database structure to the database management system specifying an object identifier for the object and a description of the behavior; wherein the behavior is fetching a web page.

6. The system of claim 5 wherein the database management is responsive to a watermark identifier extracted from a watermarked object by a watermark decoding computer to initiate a process of directing a web page to the watermark decoding computer.

7. A method for enabling a user to associate a machine behavior with an object comprising:
- presenting a user interface enabling a user to specify a physical object and a machine behavior to be associated with the object;
- receiving a specification of a physical object and a behavior to the associated with that object; and
- updating a database with an entry specifying an object identifier of the physical object and the behavior, wherein the database is operable to initiate the behavior in response to receiving an object identifier decoded from machine readable code on the physical object, wherein the specification of the object includes a registration identifier provided on the object or packaging of the object; and wherein the registration identifier is embedded in a watermark on the object.

8. The method of claim 7 wherein the user interface is launched in response to decoding the watermark on the object.

9. A method for enabling a user to associate a machine behavior with an object comprising:
- presenting a user interface enabling a user to specify an object and a machine behavior to be associated with the object;
- receiving a specification of an object and a behavior to be associated with that object; and
- updating a database with an entry specifying an object identifier of the object and the behavior, wherein the database is operable to initiate the behavior in response to receiving an object identifier decoded from machine readable code on the object; the specification of the object includes a registration identifier provided on the object or packaging of the object, the registration identifier is embedded in a watermark on the object, the user interface is launched in response to decoding the watermark on the object; and the user interface is a web based interface, and the user establishes a connection with the web based interface automatically in response to decoding the watermark on the object.

10. A computer readable medium on which stores instructions for executing the method of claim 7.

* * * * *